United States Patent
Hu et al.

(10) Patent No.: US 9,313,791 B2
(45) Date of Patent: Apr. 12, 2016

(54) SYSTEM AND METHOD FOR DROPPING AND ADDING AN AIR INTERFACE IN A WIRELESS COMMUNICATION SYSTEM

(75) Inventors: Jun Hu, San Diego, CA (US);
Yu-Chuan Lin, Carlsbad, CA (US);
Reza Shahidi, San Diego, CA (US);
Amit Mahajan, San Diego, CA (US);
Brian M. George, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 542 days.

(21) Appl. No.: 12/775,407

(22) Filed: May 6, 2010

(65) Prior Publication Data
US 2010/0291966 A1 Nov. 18, 2010

Related U.S. Application Data

(60) Provisional application No. 61/178,332, filed on May 14, 2009, provisional application No. 61/178,452, filed on May 14, 2009, provisional application No. 61/178,338, filed on May 14, 2009.

(51) Int. Cl.
*H04M 1/00* (2006.01)
*H04W 72/04* (2009.01)
*H04W 72/12* (2009.01)
*H04W 88/06* (2009.01)

(52) U.S. Cl.
CPC ........ *H04W 72/0473* (2013.01); *H04W 72/044* (2013.01); *H04W 72/1215* (2013.01); *H04W 88/06* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 5,465,410 A | 11/1995 | Hiben et al. | |
| 5,590,156 A | 12/1996 | Carney | |
| 6,282,184 B1 | 8/2001 | Lehman et al. | |
| 6,333,926 B1 | 12/2001 | Van Heeswyk et al. | |
| 6,415,146 B1 * | 7/2002 | Capece | 455/517 |
| 6,763,244 B2 | 7/2004 | Chen et al. | |

(Continued)

FOREIGN PATENT DOCUMENTS

| | | |
|---|---|---|
| CN | 1679218 A | 10/2005 |
| CN | 1759542 A | 4/2006 |

(Continued)

OTHER PUBLICATIONS

International Preliminary Report on Patentability—PCT/US2010/034951, The International Bureau of WIPO—Geneva, Switzerland, May 3, 2011.

(Continued)

*Primary Examiner* — Willie J Daniel, Jr.
(74) *Attorney, Agent, or Firm* — S. Hossain Beladi

(57) ABSTRACT

A device and method for dropping an air interface is disclosed. In one embodiment, the method comprises communicating over a first air interface and a second air interface, determining an operational parameter based at least in part on a characteristic of the first air interface, and dropping the second air interface based at least in part on the operational parameter. A device and method for adding an air interface is also disclosed. In one embodiment, the system comprises a processor configured to drop one of a plurality of concurrently established air interfaces and to subsequently determine that at least one predetermined criteria is met before attempting to add the air interface.

21 Claims, 11 Drawing Sheets

(56) References Cited

U.S. PATENT DOCUMENTS

| | | | |
|---|---|---|---|
| 6,999,759 B2* | 2/2006 | Harris et al. | 455/418 |
| 7,187,923 B2* | 3/2007 | Mousseau et al. | 455/416 |
| 7,426,648 B2 | 9/2008 | Lint et al. | |
| 7,885,658 B2* | 2/2011 | Jiang et al. | 455/437 |
| 8,792,839 B2* | 7/2014 | Hu | H04W 72/0473 370/311 |
| 2002/0061031 A1 | 5/2002 | Sugar et al. | |
| 2002/0080728 A1 | 6/2002 | Sugar et al. | |
| 2002/0131396 A1 | 9/2002 | Knuutila et al. | |
| 2003/0054788 A1 | 3/2003 | Sugar et al. | |
| 2003/0152044 A1 | 8/2003 | Turner | |
| 2004/0041538 A1 | 3/2004 | Sklovsky | |
| 2004/0095903 A1 | 5/2004 | Ryan et al. | |
| 2004/0203830 A1 | 10/2004 | Rudowicz et al. | |
| 2005/0003848 A1 | 1/2005 | Chen et al. | |
| 2005/0159153 A1* | 7/2005 | Mousseau et al. | 455/432.1 |
| 2006/0018288 A1 | 1/2006 | Luo et al. | |
| 2006/0189346 A1 | 8/2006 | Turner et al. | |
| 2006/0209803 A1 | 9/2006 | Rajaniemi et al. | |
| 2006/0281486 A1 | 12/2006 | Ngai et al. | |
| 2007/0041351 A1* | 2/2007 | Hazra et al. | 370/338 |
| 2007/0110197 A1 | 5/2007 | Bagchi et al. | |
| 2007/0111681 A1 | 5/2007 | Alberth, Jr. et al. | |
| 2007/0159399 A1 | 7/2007 | Perunka et al. | |
| 2007/0232349 A1 | 10/2007 | Jones et al. | |
| 2008/0004063 A1 | 1/2008 | Haapoja et al. | |
| 2008/0058000 A1 | 3/2008 | Tanaka et al. | |
| 2008/0117859 A1 | 5/2008 | Shahidi et al. | |
| 2008/0130727 A1 | 6/2008 | Young et al. | |
| 2008/0130728 A1 | 6/2008 | Burgan et al. | |
| 2008/0151798 A1 | 6/2008 | Camp | |
| 2008/0253351 A1 | 10/2008 | Pernu et al. | |
| 2008/0259833 A1 | 10/2008 | Ozturk et al. | |
| 2008/0261540 A1 | 10/2008 | Rohani et al. | |
| 2008/0285536 A1 | 11/2008 | Kaidar et al. | |
| 2008/0287158 A1 | 11/2008 | Rayzman et al. | |
| 2008/0287518 A1 | 11/2008 | Polenzani et al. | |
| 2008/0311912 A1 | 12/2008 | Balasubramanian et al. | |
| 2009/0093216 A1 | 4/2009 | Sun et al. | |
| 2009/0103455 A1 | 4/2009 | Balasubramanian et al. | |
| 2010/0016010 A1 | 1/2010 | Kashiwase et al. | |
| 2010/0130252 A1 | 5/2010 | Chishima et al. | |
| 2010/0136975 A1 | 6/2010 | Onishi | |
| 2010/0137023 A1 | 6/2010 | Chishima et al. | |
| 2010/0291882 A1 | 11/2010 | Hu et al. | |
| 2010/0291884 A1 | 11/2010 | Hu et al. | |
| 2011/0122972 A1 | 5/2011 | Lie et al. | |
| 2014/0302804 A1 | 10/2014 | Hu et al. | |

FOREIGN PATENT DOCUMENTS

| | | |
|---|---|---|
| CN | 1791276 A | 6/2006 |
| CN | 1881821 A | 12/2006 |
| CN | 1980421 A | 6/2007 |
| EP | 1727291 | 11/2006 |
| FR | 2920063 | 2/2009 |
| JP | 2005012815 A | 1/2005 |
| JP | 2007274537 A | 10/2007 |
| JP | 2008035290 A | 2/2008 |
| JP | 2008061014 A | 3/2008 |
| JP | 2008136137 A | 6/2008 |
| JP | 2008521309 A | 6/2008 |
| JP | 2008172450 A | 7/2008 |
| JP | 2008244989 A | 10/2008 |
| JP | 2008252395 A | 10/2008 |
| JP | 2008545295 A | 12/2008 |
| JP | 2009005195 A | 1/2009 |
| JP | 2009060250 A | 3/2009 |
| JP | 2009065307 A | 3/2009 |
| JP | 2009206954 A | 9/2009 |
| JP | 2009532965 A | 9/2009 |
| WO | WO0051376 | 8/2000 |
| WO | 02075955 | 9/2002 |
| WO | WO03009557 | 1/2003 |
| WO | WO2006038085 | 4/2006 |
| WO | 2006053951 A1 | 5/2006 |
| WO | 2007112880 A1 | 10/2007 |
| WO | 2007113319 A1 | 10/2007 |
| WO | 2008131443 A2 | 10/2008 |
| WO | 2009021008 A1 | 2/2009 |

OTHER PUBLICATIONS

International Search Report and Written Opinion—PCT/US2010/034018, International Search Authority—European Patent Office—Aug. 17, 2010.

Taiwan Search Report—TW099115548—TIPO—Nov. 27, 2013.

Huawei: Consideration on E-TFC selection for DC-HSUPA,3GPP TSG RAN WG2 Meeting #66, Apr. 28, 2009, R2-093154, URL,http://www.3gpp.org/ftp/tsgran/wg2rl2/TSGR266/Docs/R2-093154.zip.

Nokia et al: "Power scaling in dual carrier HSUPA" 3GPP Draft; R1-092080, 3rd Generation Partnership Project (3GPP), Mobile Competence Centre ; 650, Route Des Lucioles ; F-06921 Sophia-Antipolis Cedex; France, no. San Francisco, USA; Apr. 29, 2009, XP050339531.

Qualcomm Europe: "UE Implementation Impact due to DC-HSUPA", 3GPP TSG RAN WG1 Meeting #55bis, R1-090434, Jan. 16, 2009.

* cited by examiner

SYSTEM AND METHOD FOR DROPPING AND ADDING AN AIR INTERFACE IN A WIRELESS COMMUNICATION SYSTEM

CROSS-REFERENCE TO RELATED APPLICATIONS

This application claims priority under §119(e) to the following U.S. Provisional Applications: (1) U.S. Prov. App. No. 61/178,332, entitled "System and method for resolving conflicts between air interfaces in a wireless communication system," filed May 14, 2009, (2) U.S. Prov. App. No. 61/178,452, entitled "Allocating transmit power among multiple air interfaces," filed May 14, 2009, and (3) U.S. Prov. Appl. No. 61/178,338, entitled "System and method for dropping and adding an air interface in a wireless communication system," filed May 14, 2009. The above-referenced applications are herein incorporated by reference in their entirety.

BACKGROUND

1. Field

This disclosure relates to wireless communication.

2. Description of the Related Technology

Wireless communication systems exist which are capable of communicating over multiple air interfaces, but are not capable of concurrently communicating over multiple air interfaces. Thus, a need exists for wireless communication systems able to concurrently communicate over multiple air interfaces.

SUMMARY OF THE INVENTION

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description" one will understand how the features of this invention provide advantages that include concurrent communication over multiple air interfaces.

One aspect of the disclosure is a method of dropping an air interface, the method comprising concurrently communicating over a first air interface and a second air interface, determining an operational parameter based at least in part on a characteristic of the first air interface, and dropping the second air interface based at least in part on the operational parameter.

Another aspect of the disclosure is a device for dropping an air interface, the device comprising a transceiver configured to concurrently communicate over a first air interface and a second air interface, and a processor configured to drop the second air interface based at least in part on an operational parameter, wherein the operational parameter is based at least in part on a characteristic of the first air interface.

Another aspect of the disclosure is a device for dropping an air interface, the device comprising means for concurrently communicating over a first air interface and a second air interface, means for determining an operational parameter based at least in part on a characteristic of the first air interface, and means for dropping the second air interface based at least in part on the operational parameter.

Still another aspect of the disclosure is a computer chip encoded with instructions for executing a method of dropping an air interface, the method comprising concurrently communicating over a first air interface and a second air interface, determining an operational parameter based at least in part on a characteristic of the first air interface, and dropping the second air interface based at least in part on the operational parameter.

One aspect of the disclosure is a method of adding an air interface, the method comprising dropping one of a plurality of concurrently established air interfaces, determining, after dropping the air interface, that at least one predetermined criterion is met, and adding the air interface after the determination.

Another aspect of the disclosure is device for adding an air interface, the device comprising a processor configured to drop one of plurality of concurrently established air interfaces and to subsequently determine that at least one predetermined criteria is met before attempting to add the air interface.

Another aspect of the disclosure is a device for adding an air interface, the device comprising dropping one of a plurality of concurrently established air interfaces, determining, after dropping the air interface, that at least one predetermined criterion is met, and adding the air interface after the determination.

Still another aspect of the disclosure is a computer chip encoded with instructions for executing a method of adding an air interface, the method comprising dropping one of a plurality of concurrently established air interfaces, determining, after dropping the air interface, that at least one predetermined criterion is met, and adding the air interface after the determination.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
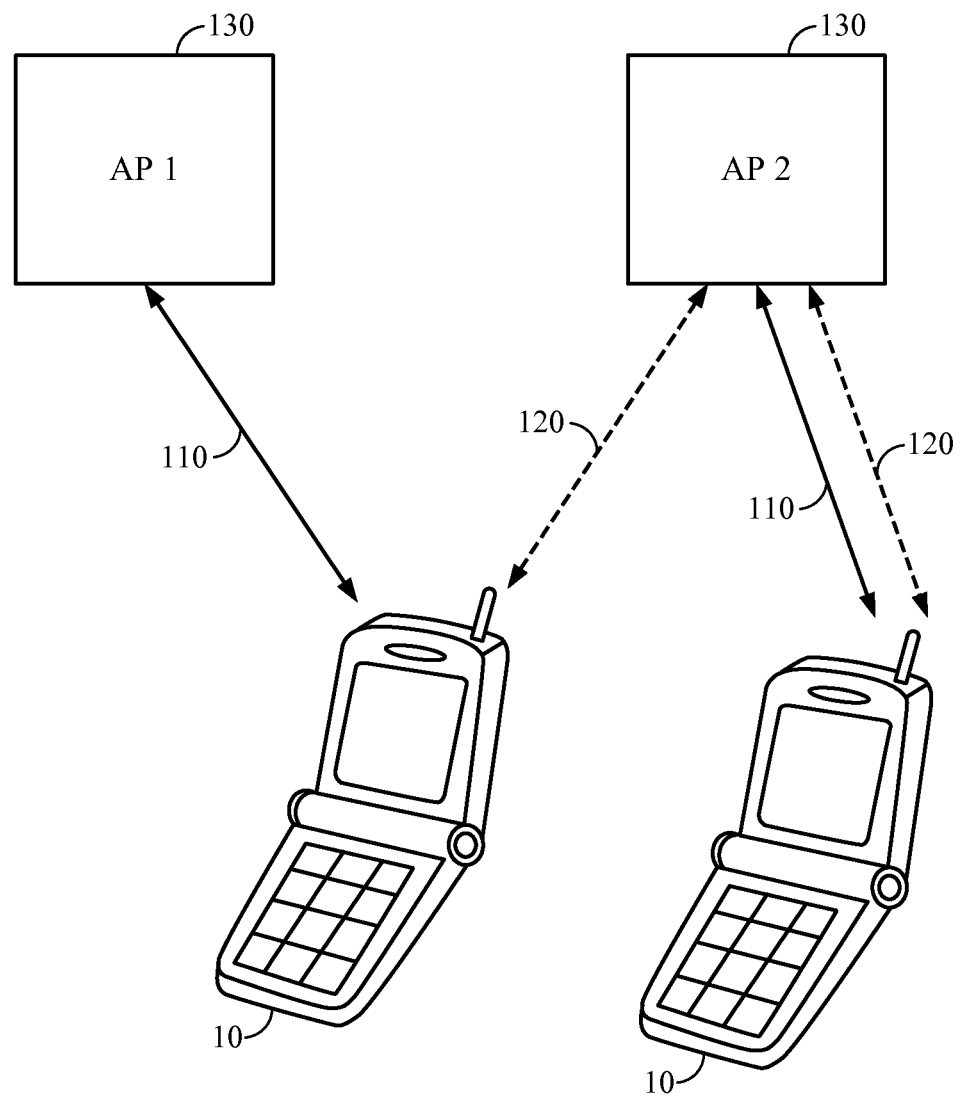
FIG. 1 is a diagram illustrating wireless communication devices engaged in simultaneous communication over two air interfaces.

FIG. 1 is a diagram illustrating wireless communication devices engaged in simultaneous communication over two air interfaces. Each wireless communication device 10 can simultaneously establish a first air interface 110 and a second air interface 120 between itself and one or more access points 130. In one embodiment, the first air interface 110 is established at a first channel defined by a first frequency or frequency band, whereas the second air interface 120 is established at a second channel defined by a second frequency or frequency band which is different from the first frequency or frequency band.

In one embodiment, the first air interface 110 supports 1xRTT traffic and the second air interface 120 supports EVDO traffic. 1xRTT, also known as 1x, 1xRTT, and IS-2000, is an abbreviation of 1 times Radio Transmission Technology. EVDO, abbreviated as EV or DO, is an abbreviation of Evolution-Data Only. Both 1xRTT and EVDO are telecommunications standards for the wireless transmission of data through radio signals maintained by 3GPP2 (3$^{rd}$ Generation Partnership Project), which are considered types of CDMA2000 (Code Division Multiple Access 2000).

In other embodiments, the first air interface 110 or the second air interface 120 can support 1xAdvanced, DO (Release 0, Revision A or B), UMTS (HSPA+), GSM, GPRS, and EDGE technologies.

Figure 2A:
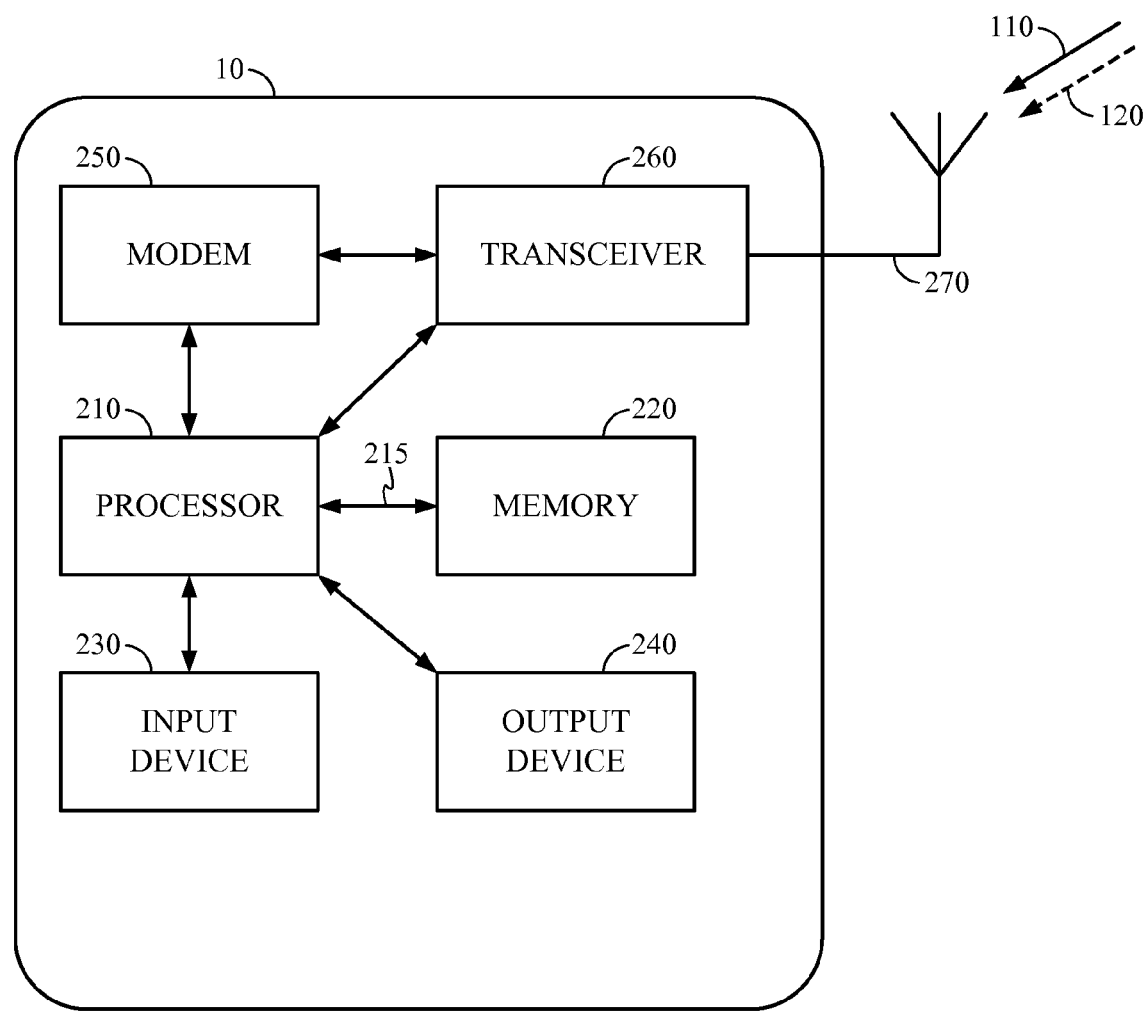
FIG. 2A is a functional block diagram of a wireless communication device.

FIG. 2 is a functional block diagram of a wireless communication device. The wireless communication device 10 includes a processor 210 in data communication with a memory 220, an input device 230, and an output device 240. The processor is further in data communication with a modem 250 and a transceiver 260. The transceiver 260 is also in data communication with the modem 250 and an antenna 270. Although described separately, it is to be appreciated that functional blocks described with respect to the wireless communication device 10 need not be separate structural elements. For example, the processor 210 and memory 220 may be embodied in a single chip. Similarly, two or more of the processor 210, modem 250, and transceiver 260 may be embodied in a single chip.

The processor 210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 210 can be coupled, via one or more buses 215, to read information from or write information to memory 220. The processor may additionally, or in the alternative, contain memory, such as processor registers. The memory 220 can include processor cache, including a multi-level hierarchical cache in which different levels have different capacities and access speeds. The memory 220 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 210 is also coupled to an input device 230 and an output device 240 for, respectively, receiving input from and providing output to, a user of the wireless communication device 10. Suitable input devices include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, and haptic output devices, including force-feedback game controllers and vibrating devices.

The processor 210 is further coupled to a modem 250 and a transceiver 260. The modem 250 and transceiver 260 prepare data generated by the processor 210 for wireless transmission via the antenna 270 according to one or more air interface standards. For example, the antenna 270 may facilitate transmission over a first air interface 110 and a second air interface 120. The modem 250 and transceiver 260 also demodulate data received via the antenna 270 according to one or more air interface standards. The transceiver can include a transmitter, receiver, or both. In other embodiments, the transmitter and receiver are two separate components. The transceiver 260 can include a first transceiver 261a and a second transceiver 261b. The modem 250 and transceiver 260, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 2B:
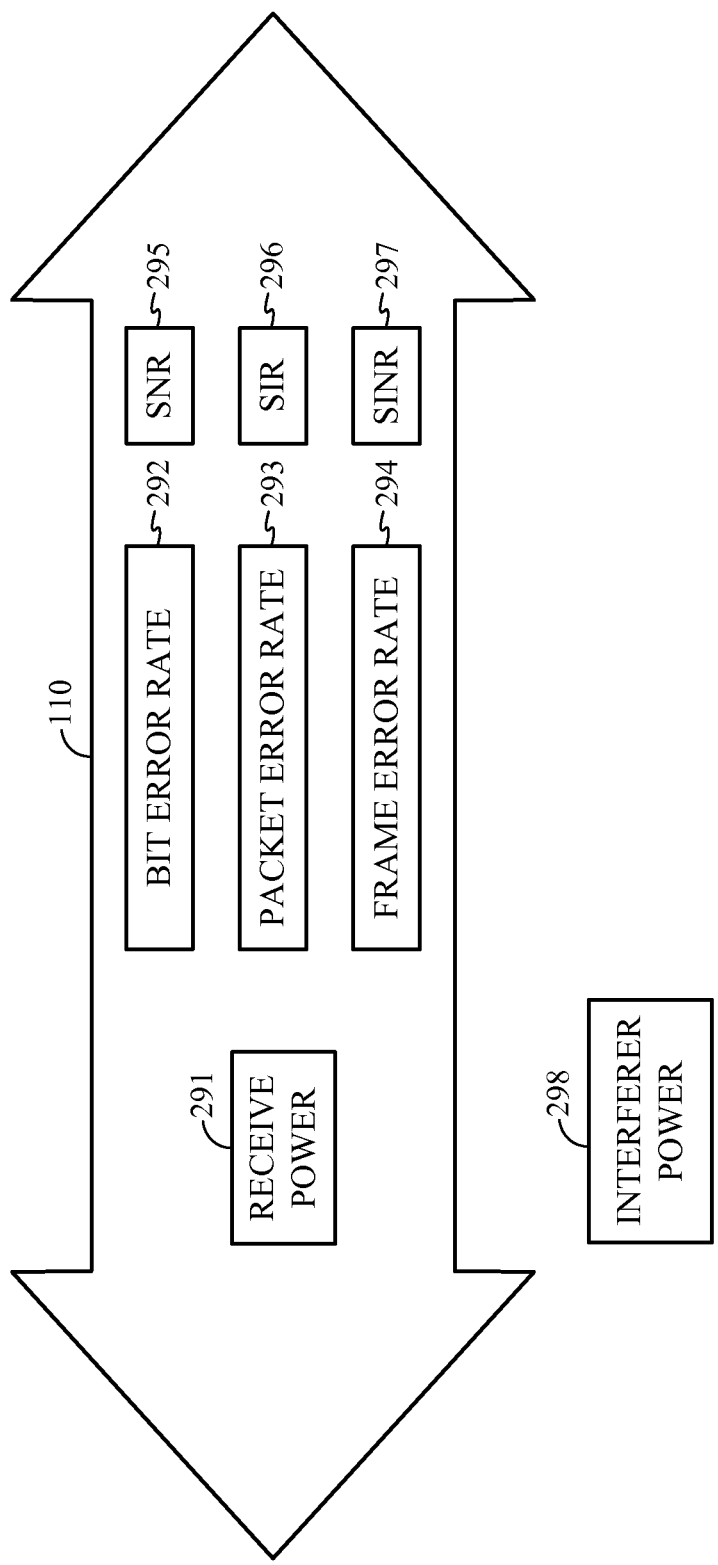
FIG. 2B is a representational block diagram of air interface characteristics.

FIG. 2B is a representational block diagram of air interface characteristics upon which an operational parameter may be based as described below. The air interface 110 has a number of characteristics, including a receive power 291, a bit error rate 292, a packet error rate 293, a frame error rate 294, a signal-to-noise ratio 295, a signal-to-interference ratio 296, and a signal-to-interference-plus-noise ratio 297. An operational parameter may also be based on an interference power 298 at a frequency near the frequency at which communication over the air interface 110 occurs.

Figure 3:
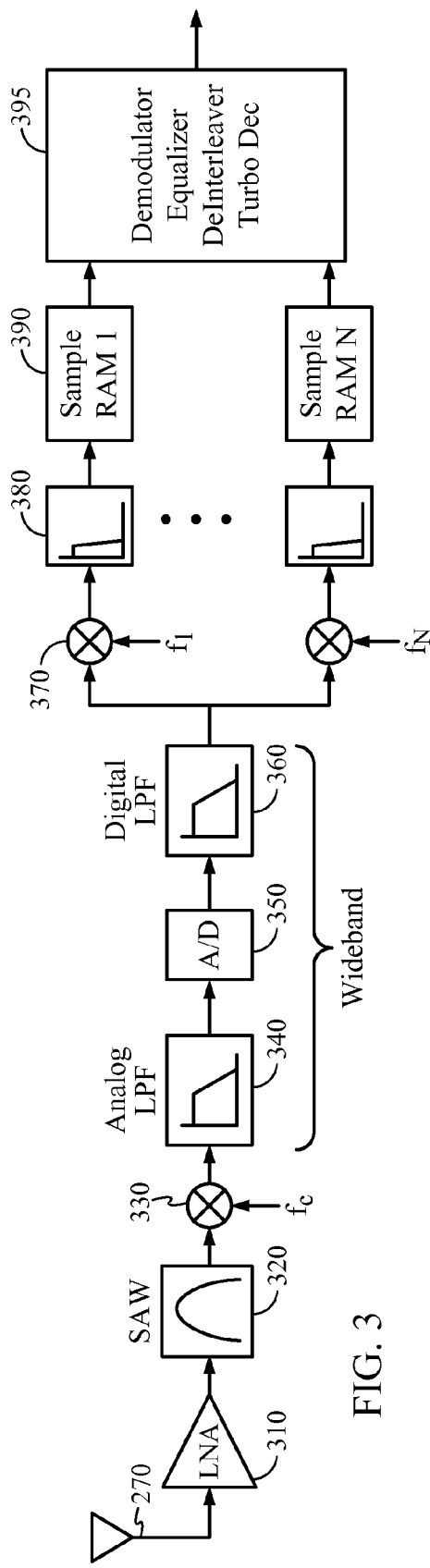
FIG. 3 is a functional block diagram of a receiver of a wireless communication device.

FIG. 3 is a functional block diagram of a receiver of a wireless communication device. FIG. 3 illustrates exemplary component which may be embodied in the transceiver 260 of FIG. 2. A signal received on the antenna 270 is amplified by a low-noise amplifier 310. Depending on the particular embodiment, the amplified signal is then pass through a SAW (surface acoustic wave) filter 320. A SAW filter is an electro-mechanical device in which electrical signals are converted into a mechanical wave in a device constructed of a piezo-electric crystal or ceramic. The mechanical wave is delayed as it propagates across the device before being converted back into an electric signal by electrodes. The delayed outputs are recombined to produce a direct analog implementation of a finite impulse response filter. The signal is then multiplied by a center frequency at a multiplier 330. The base-banded signal is then passed through an analog low-pass filter 340, converted to a digital signal at an analog-to-digital converter 350, and filtered once again with a digital low-pass filter 360.

The signal is then split into multiple paths. Each path is multiplied by a different frequency at a multiplier 370 and passed through an appropriate filter 380 before being sampled with a sampler 390. Further processing, including demodulation, equalization, deinterleaving, and error correction coding, can be performed in a processing module 395 or the modem 250 or processor 210 of FIG. 2.

Figure 4:
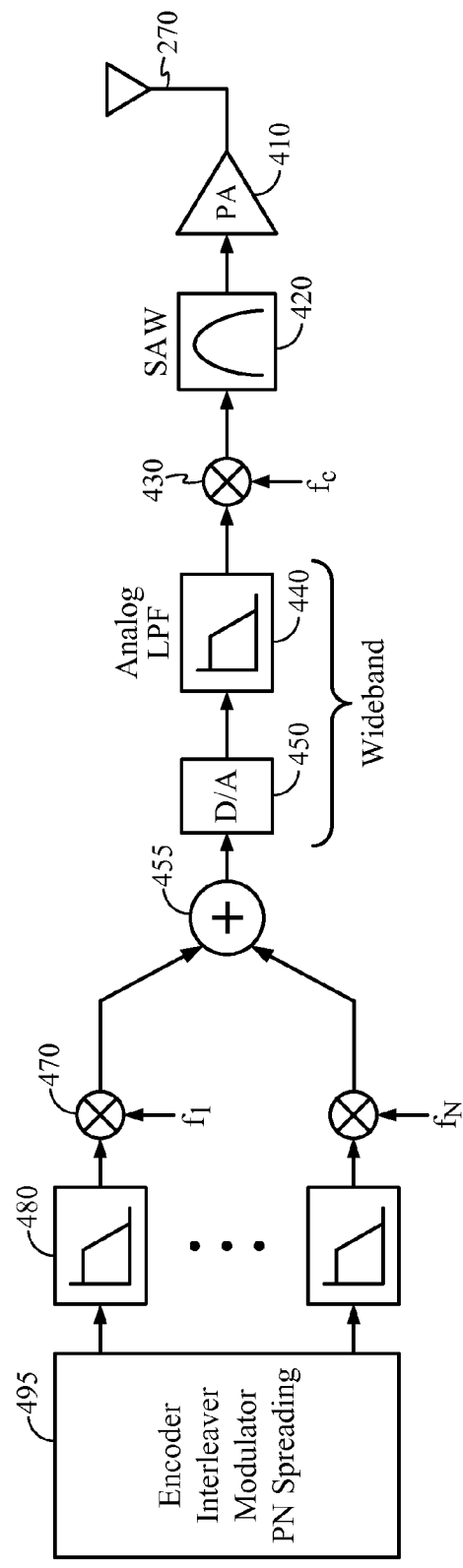
FIG. 4 is a functional block diagram of a transmitter of a wireless communication device.

FIG. 4 is a functional block diagram of a transmitter of a wireless communication device. FIG. 4 illustrates additional exemplary components which may be embodied in the transceiver 260 of FIG. 2. The function of the transmitter is similar to that of the receiver, but in reverse. In particular, data generated by the processor 210 of FIG. 2 may be subject to preliminary processing in a processing module 495, the modem 250 or the processor 210 itself. The data for each channel is passed through an appropriate filter 480 before being modulated at a multiplier 470. The modulated carriers are added together at an adder 455 before being converted into an analog signal at a digital-to-analog converter 450. The analog signal is passed through an analog low-pass filter 440 before being modulated to a center frequency at a multiplier 430. The modulated signal is optionally passed through a SAW filter 420 and a power amplifier 410 before being transmitter via the antenna 270.

As described above with respect to FIG. 1, a wireless device 10 is capable of establishing a first air interface 110 and a second air interface 120. Such a wireless device is able to support simultaneous voice and data services in which two different technologies (such as 1x and DO) are used at the same wireless device at the same time. Under certain scenarios, using shared resources to support two air interfaces results in performance degradation of one or more of the interfaces.

One scenario which may result in a degradation of performance is a large power imbalance between the two technologies. Due to many factors (loading, fading, shadowing, near/far problem, etc.), the transmit power and/or receiver power can be quite different for two supported interfaces. This imbalance can degrade one or more air interfaces due to mixer image noise, quantization noise, RPC resolution, emission, etc. This can effect both the forward link and reverse link.

Another scenario which may result in a degradation of performance is when the system is power-limited. Both air interfaces can share the same power amplifier, such as power amplifier 410 in FIG. 4, which can necessarily provide only a finite amount of transmit power. In marginal coverage areas, this power may not be enough to support two interfaces with reasonable performances for both interfaces. If the wireless device attempts to support both interfaces, performance will be degraded.

Yet another scenario which may result in a degradation of performance is when an in-band RF interferer is present. If a wireless device, such as the wireless device 10 of FIG. 2, is communicating over two interfaces, it may be configured in a wideband mode. For example, if communication over the first air interface occurs at a first frequency and communication over the second air interface occurs over a second frequency, the transceiver may receive, and process these frequencies and those inbetween. If there is an RF interferer falling within this range, it may saturate the analog-to-digital converter, such as the analog-to-digital converter 350 of FIG. 3, which results in performance degradation.

Figure 5:
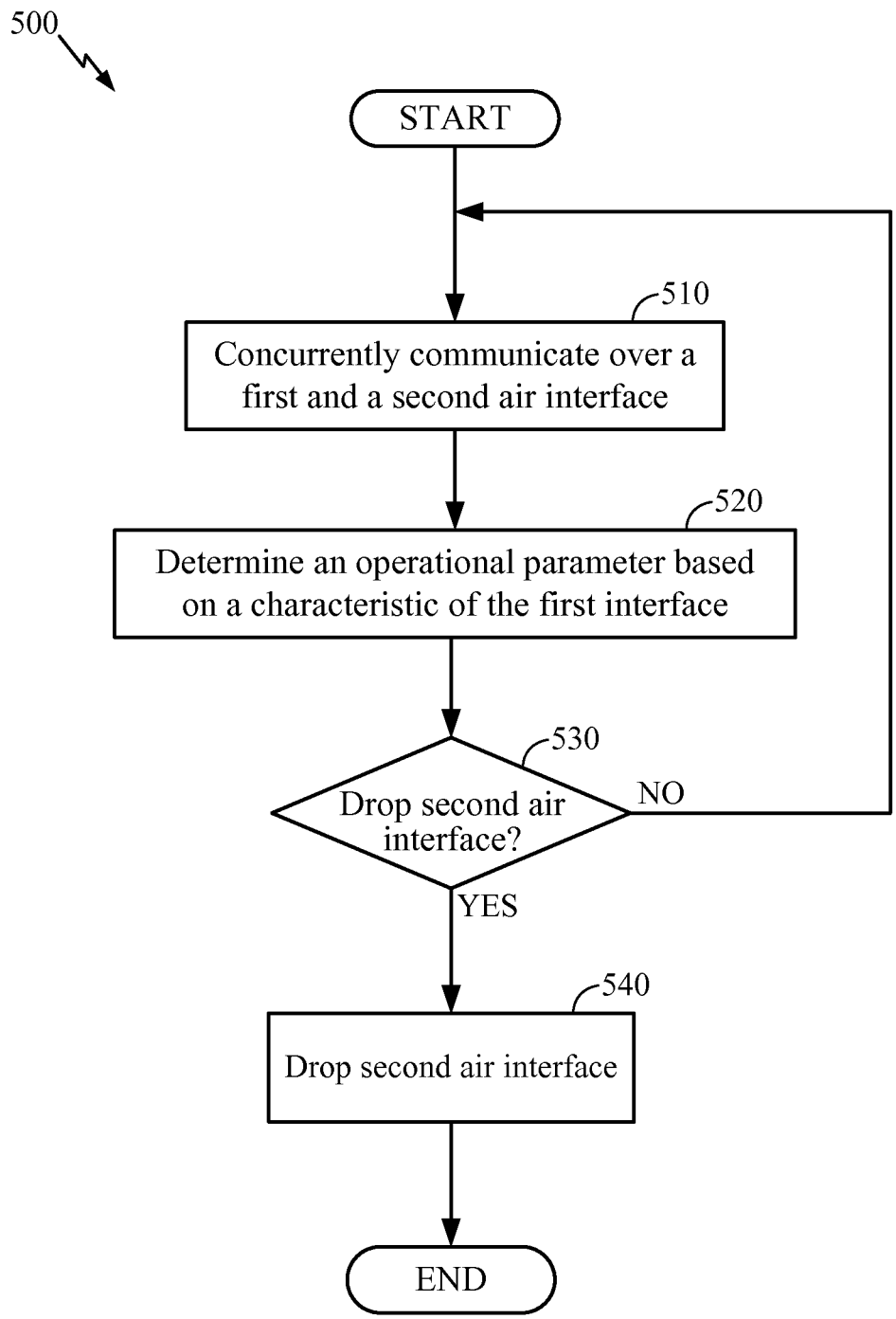
FIG. 5 is a flowchart illustrating a method of dropping an air interface.

In order to avoid such performance degradation, one of the air interfaces can be dropped such that better performance is realized on the other air interface. FIG. 5 is a flowchart illustrating a method of dropping an air interface. The process 500, begins, in block 510 with concurrent communication over a first air interface and a second air interface. The first and second air interface can be an 1xRTT interface, an 1xAdvanced interface, a 1Xtreme interface, an EVDO interface, an EV-DV interface, a CDMA200 interface, a DO (Release 0, Revision A or B) interface, an UMTS (HSPA+) interface, a GSM interface, a GPRS interface, an EDGE interface, or any other interface known to those skilled in the art. The communication over the first and second air interface can be performed by the wireless device 10 of FIG. 1. Alternatively, the communication can be performed by at least one of the processor 210, modem 250, transceiver 260, or antenna 270 of FIG. 2.

Next, in block 520, an operational parameter is determined based at least in part on a characteristic of the first air interface. The operational parameter can be determined by the processor 210 with inputs from other components, including the antenna 270 or input device 230. The operational parameter can include a power imbalance based on the receive power of the first air interface and the receive power of the second air interface. The operational parameter can include other metrics based on the receive power of the first air interface and/or receive power of the second air interface. The operational parameter can include a frame error rate of the communication over the first air interface. The operational parameter can include a bit error rate, a packet error rate, a signal-to-noise ratio, a signal-to-interference ratio, or a signal-to-interference-plus-noise ratio of the first air interface. The operational parameter can include an interference power at a frequency near the first frequency at which communication over the first interface occurs. The operational parameter can include the presence (or absence) or an RF interferer between a first frequency at which communication over the first air interface occurs and a second frequency at which communication over the second air interface occurs. The operational parameter can include any combination or calculation based on the above-mentioned characteristics or other measures.

In block 530, it is determined whether or not to drop the second air interface based on the operational parameter. The determination to drop the second air interface can be performed by the processor 210 of FIG. 2. This determination can include comparing the operational parameter to a threshold. This determination can include using more than one operational parameter to define a logical function resulting in a determination that the second air interface should be dropped (TRUE) or should not be dropped (FALSE).

If it is determined, in block 530, that the second air interface should not be dropped, the process 500 returns to block 510. Alternatively, the process 500 return to block 520. If it is determined, in block 530, that the second air interface should be dropped, the process 500 continues to block 540 where the second air interface is dropped.

Figure 6:
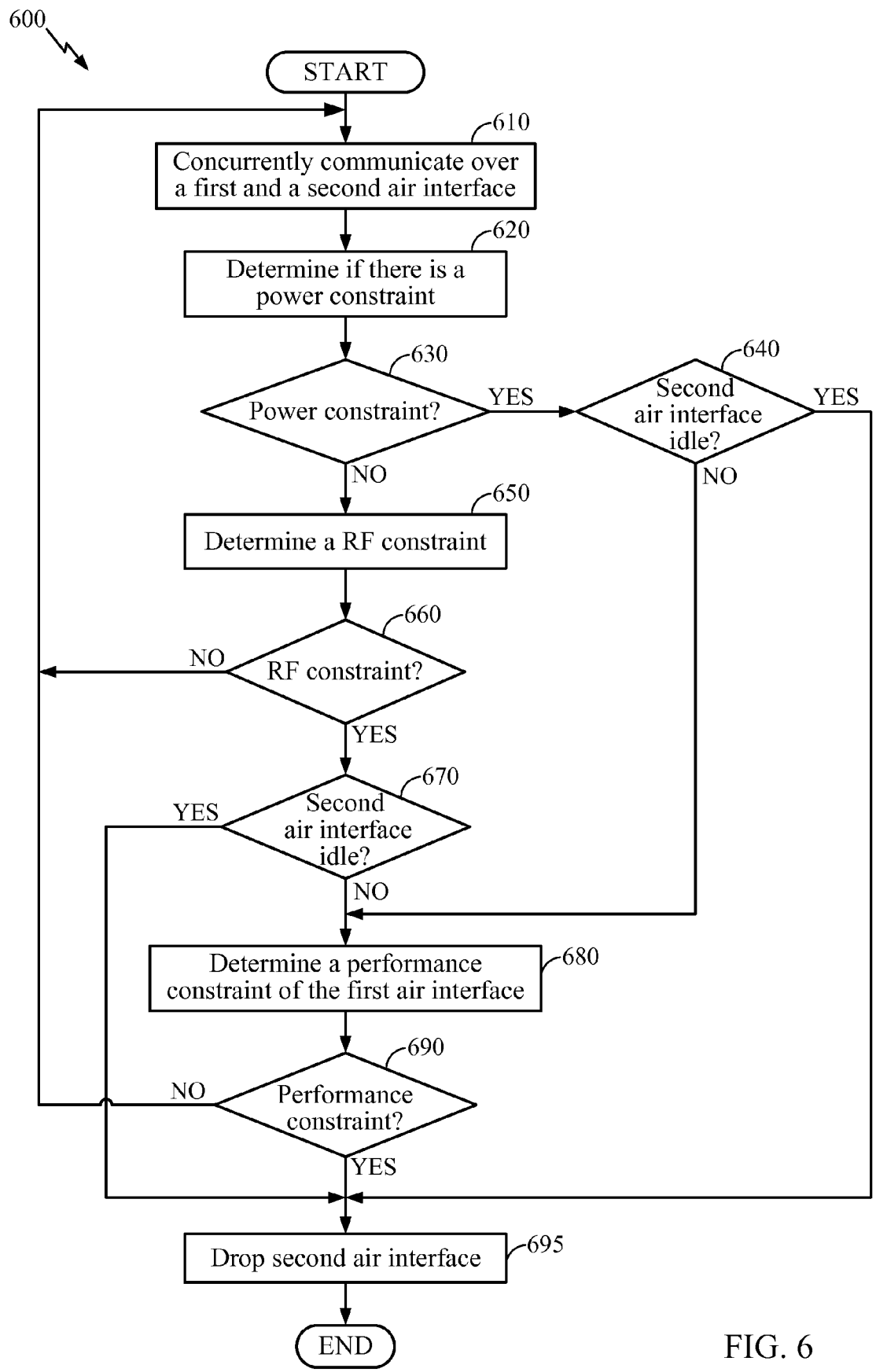
FIG. 6 is a flowchart illustrating another method of dropping an air interface.

A specific implementation of the process 500 of FIG. 5 is illustrated by the flowchart in FIG. 6. In particular, FIG. 6 is a flowchart illustrating another method of dropping an air interface. In one embodiment of the process 600, the second air interface will be dropped if the second air interface is in an idle state and there is either a power imbalance, an RF interferer present, or both. In this embodiment, the second air interface will also be dropped if the second air interface is in a traffic state, an error rate is too high, and there is either a power imbalance, an RF interferer present, or both. The process 600 reaches these results with the least number of redundant determinations.

The process 600 begins, in block 610, with concurrent communication over a first and a second air interface. The process continues to block 620 where it is determined if there is a violation of a power constraint. In one embodiment, the violation of the power constraint is indicative of a power imbalance. In one embodiment, determining if there is a power imbalance includes a number of sub-steps. In one embodiment, the receive power of the first air interface is measured and then fed into a 1-tap IIR filter with a first time constant, where the first time constant is based on whether the first air interface is in an acquisition mode or a tracking mode. The receive power of the second air interface is also measured and fed into a 1-tap IIR filter with a second time constant, where the second time constant is based on whether the second air interface is in an acquisition mode or a tracking mode. Both of the filter outputs are converted into decibels (or another logarithmic measure) and the difference between the two is determined. If the absolute value of this difference is greater than a predefined threshold and less than both of the air interfaces (the first, the second, or neither) are in acquisition mode and less than both of the air interfaces are performing an off frequency search (OFS) or hard hand-off, it is determined that a power imbalance exists. Otherwise, it is determined that a power imbalance does not exist.

The process then continues to decision block 630, which outputs to block 640 if the power constraint is violated and to block 650 if the power constraint is not violated. In block 640, it is further determined if the second air interface is in an idle state or a traffic state. If the second air interface is in an idle state, the process bypasses further determination (as such determination would not affect the final result) and the second air interface is dropped in block 695. If the second air interface is in a traffic state, the process bypasses determination of an RF constraint (as it would not affect the end result) and goes to block 680.

As mentioned above, if the power constraint is not violated, the process continues to block 650. In block 650 it is determined if an RF constraint is violated. This determination can be performed by an RF chip and be indicative of any reason to drop the second air interface. In one embodiment, violation of the RF constraint is indicative of the presence of an RF interferer, which can be detected at any frequency between the center frequencies of the first air interface and second air interface.

The process continues from block 650 to decision block 660 which outputs to block 670 if an RF interferer is present, but returns to block 610 otherwise. The process returns to block 610 as it determines that there is no violation of either the power constraint or the RF constraint. Further determination would not affect the final result so it is skipped. In block 670, the system determines if the second air interface is in an idle state or a traffic state. If the second air interface is in an idle state, the process bypasses further determination (as such determination would not affect the final result) and the second air interface is dropped in block 695. If the second air interface is in a traffic state, the process continues to block 680.

At block 680, reached if it is determined that there is a violation of either the power constraint or the RF constraint and that the second air interface is not in an idle state, a performance constraint of the first air interface is determined. In one embodiment, the performance constraint is violated if an error rate is too high. The error rate may, for example, be a frame error rate, a packet error rate, a bit error rate, a frame drop rate, etc. The frame error rate may be determined by checking if the frame passes a cyclic redundancy check (CRC). The frame error rate can also be filtered. A 1-tap IIR filter with a error rate time constant can be used.

The process 600 continues to block 690 where it is determined whether or not the performance constraint is violated. If it is determined that the performance constraint is violated, the process 600 continues to block 695 where the second air interface is dropped. Otherwise, the process 600 returns to block 610.

The second air interface can be dropped, in block 695, by storing a ConnectionFailure record with ConnectionFailureReason='0×1' (Connection failure due to tune away) and/or by switching to a narrowband mode communicating only over the first air interface.

Figure 7:
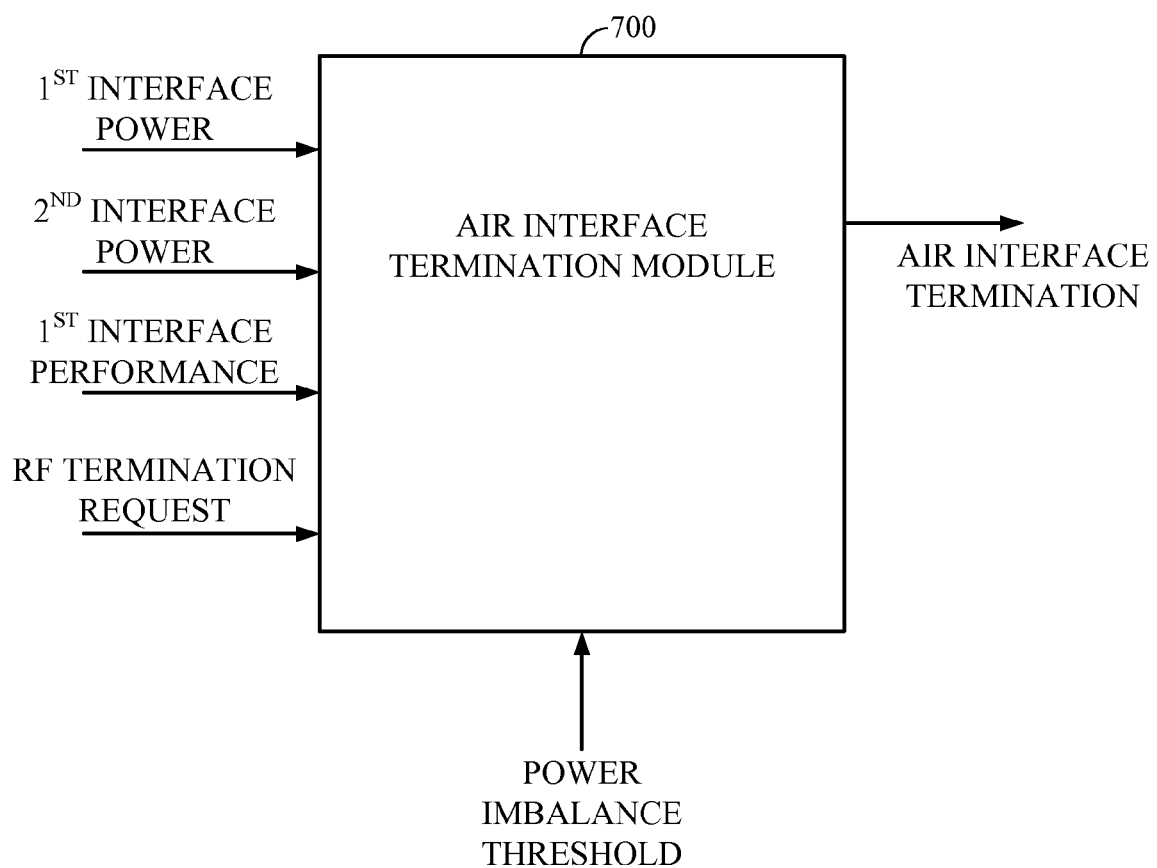
FIG. 7 is a functional block diagram of a module for dropping an air interface.

FIG. 7 is a functional block diagram of a module for dropping an air interface. Such a module can be embodied in software, firmware, hardware, or some combination thereof. The module can be configured to perform at least one of the processes 500, 600 described above with respect to FIGS. 5 and 6, respectively. The module 700 receives at least one operational parameter as an input, and can also receive one or more parameters such as a threshold or a time constant. The illustrated module 700 receives the receive power of the first air interface, the receive power of the second air interface, a measure of the first air interface's performance (such as an error rate), and a termination request from the RF chip (which may indicate the presence of an RF interferer). The illustrated module 700 also receives a power imbalance threshold, as described above with respect to FIG. 6. Output from the module 700 is a decision regarding whether the second air interface should be dropped. This decision can include instructions to drop a second air interface. This decision can also include information that the second air interface should not be dropped, or simply output nothing in the case that the second air interface should not be dropped.

After the second air interface is dropped, the wireless device may soon attempt to reinitialize (or add) the second air interface. If it is successful prior to a change a conditions, this will result in the second air interface being dropped once again. This process will result in the second air interface being dropped and added repeatedly, leading to a degradation in performance. Thus, when an air interface is dropped, it is precluded from being added until specific criteria are met.

Figure 8:
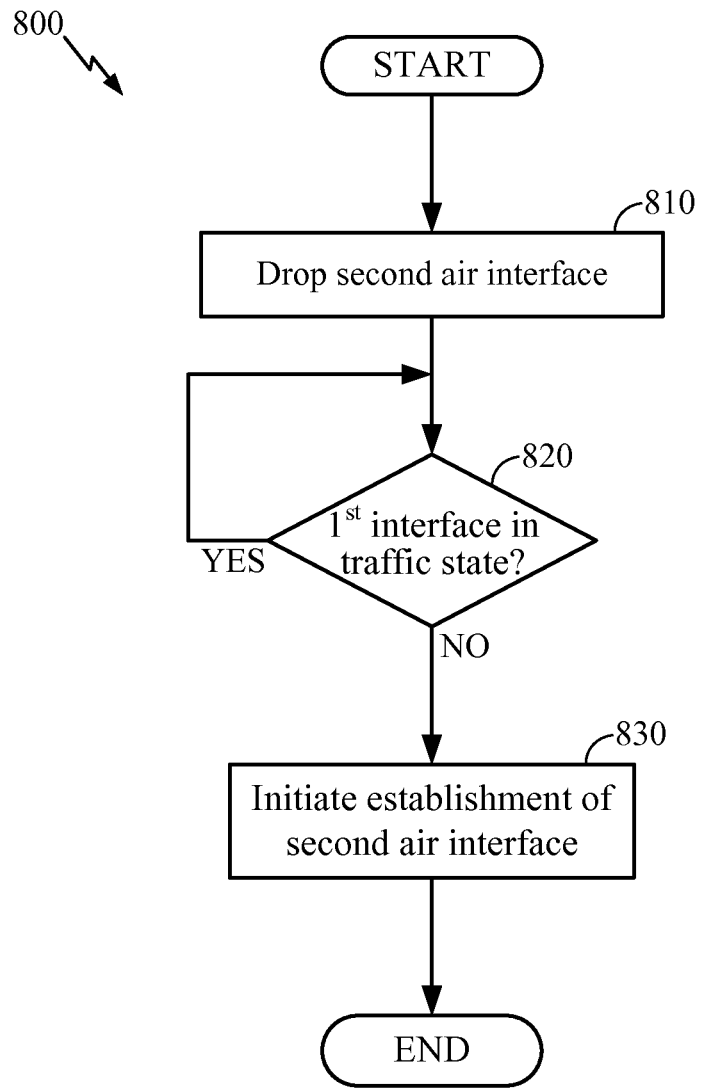
FIG. 8 is a flowchart illustrating a method adding an air interface.

FIG. 8 is a flowchart illustrating a method for adding an air interface. The process 800 begins, in block 810, by dropping a second air interface. This drop may be based, at least in part, on an operational parameter based on a characteristic of a first air interface. Such a result may occur in block 540 of FIG. 5 or block 695 of FIG. 6, for example. The process 800 continues to decision block 820, where it remains so long as the first air interface is in a traffic state. The first air interface may be in a traffic state if traffic is being communicated over channel. The first air interface may also be in a traffic state if traffic is expected to be communicated over the channel. For example, the channel may be reserved for traffic or non-continuous traffic may be transmitted. Determination that the first air interface is no longer in a traffic state may be based on the non-detection of traffic for a predetermined time. Once the first air interface is no longer in a traffic state, the process 800 continues to block 830 where establishment of the second air interface is initiated.

Figure 9:
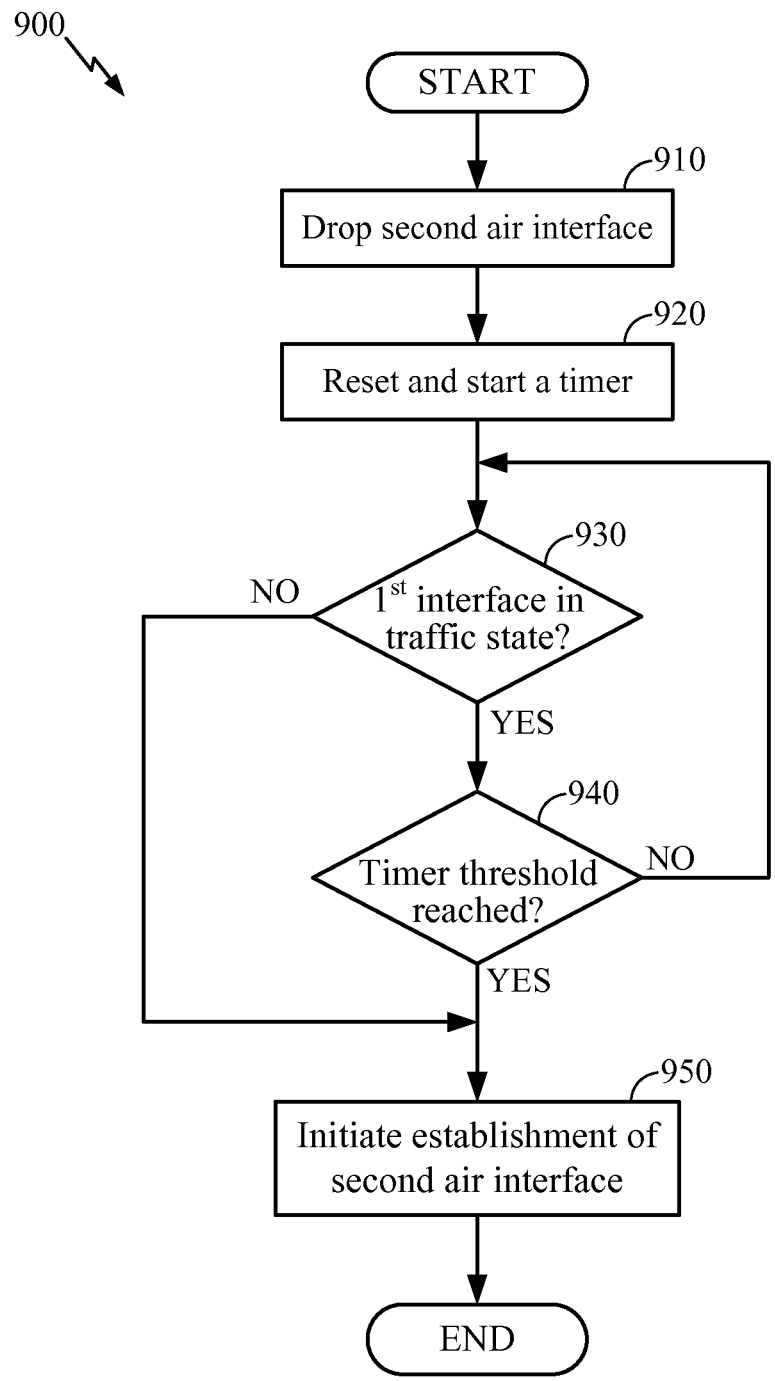
FIG. 9 is a flowchart illustrating a method of adding an air interface based on time.

FIG. 9 is a flowchart illustrating a method for adding an air interface based on a timer. The process 900 begins, in block 910, by dropping a second air interface. This drop may be based, at least in part, on an operational parameter based on a characteristic of a first air interface. The process 900 continues to block 920 where a timer is set to zero and started.

Next, in decision block 930, it is determined if the first air interface is in a traffic state. The first air interface may be in a traffic state if traffic is being communicated over channel. The first air interface may also be in a traffic state if traffic is expected to be communicated over the channel. For example, the channel may be reserved for traffic or non-continuous traffic may be transmitted. Determination that the first air interface is no longer in a traffic state may be based on the non-detection of traffic for a predetermined time. If the first air interface is not in a traffic state, the timer is not used and the process continues to block 950 where establishment of the second air interface is initiated. If the first air interface is in a traffic state, the process continues to decision block 940 where the time from the timer is compared to a threshold. If the time from the timer is greater than a threshold, the process continues to block 950 where establishment of the second air interface is initiated. Thus, the second air interface can be added after a drop if at least one of the following is true: (1) the first interface is not in a traffic state or (2) a predetermined time has passed. If neither of these is true, the process returns to decision blocks 930 and 940 until one of them is true and the second air interface can be added again.

Figure 10:
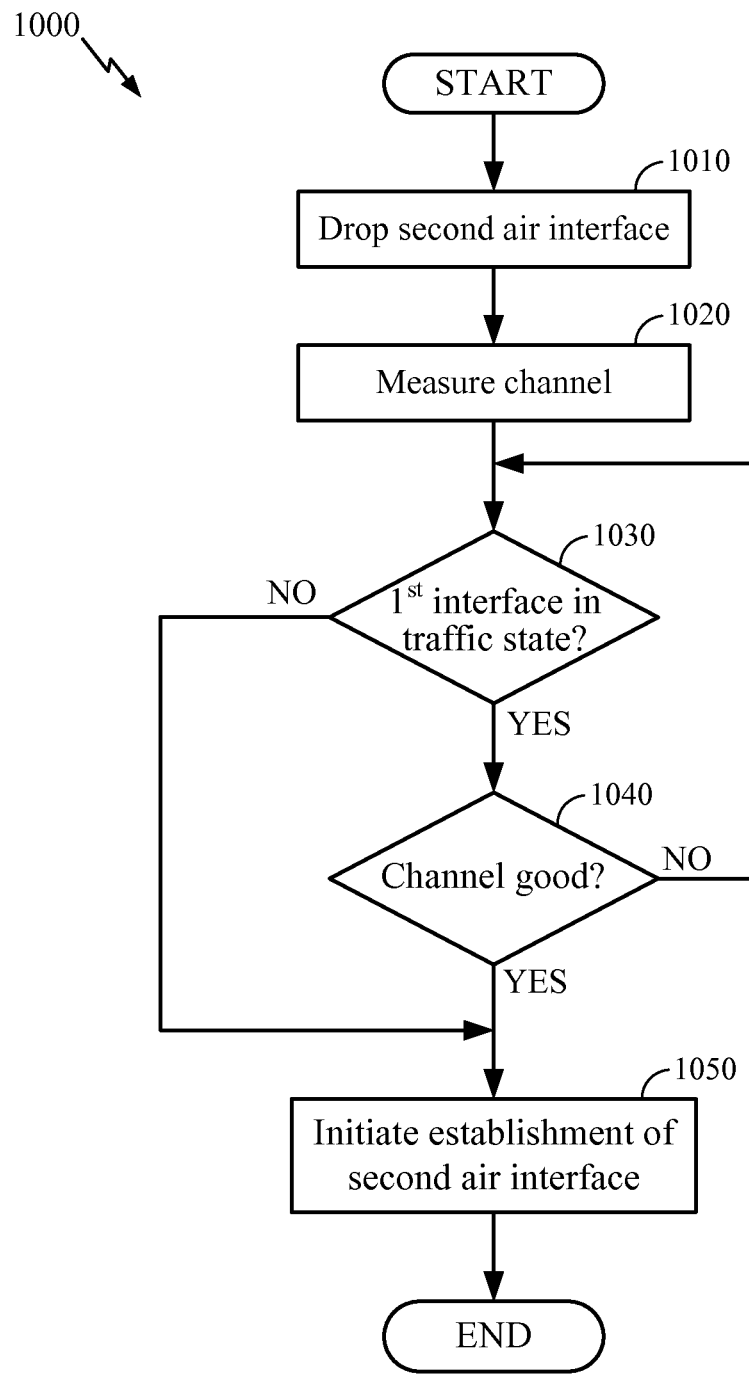
FIG. 10 is a flowchart illustrating a method of adding an air interface based on a channel measurement.

FIG. 10 is a flowchart illustrating a method for adding an air interface based on measuring a channel. The process 1000 begins, in block 1010, by dropping a second air interface. This drop may be based, at least in part, on an operational parameter based on a first air interface. The process 1000 continues to block 1020 where a channel is measured. The channel can be measured in the process of communicating over the first air interface, or by using alternate resources not in use by either the first air interface or the second air interface.

Next, in decision block 1030, it is determined if the first air interface is in a traffic state. The first air interface may be in a traffic state if traffic is being communicated over channel. The first air interface may also be in a traffic state if traffic is expected to be communicated over the channel. For example, the channel may be reserved for traffic or non-continuous traffic may be transmitted. Determination that the first air interface is no longer in a traffic state may be based on the non-detection of traffic for a predetermined time. If the first air interface is not in a traffic state, the channel measurement is moot and the process continues to block 1050 where establishment of the second air interface is initiated. If the first air interface is in a traffic state, the process continues to decision block 1040 where the channel measurement is used to determine if the channel is "good."

In one embodiment, the channel is good if the signal-to-noise ratio is above a predetermined threshold. If it is determined that the channel is good, the process continues to block 1050 where establishment of the second air interface is initiated. Thus, the second air interface can be added after a drop if at least one of the following is true: (1) the first interface is not in a traffic state or (2) a channel measurement indicates that the second air interface can be added. If neither of these is true, the process returns to decision blocks 1030 and 1040 until one of them is true and the second air interface can be added again.

Although three criteria are discussed above with respect to FIGS. 8, 9, and 10, other criteria could be used to determine if a dropped air interface should be added. For example, if the second air interface was dropped due to a lack of adequate power, a drop in transmit power of the first air interface may indicate that the second air interface can be added.

Figure 11:
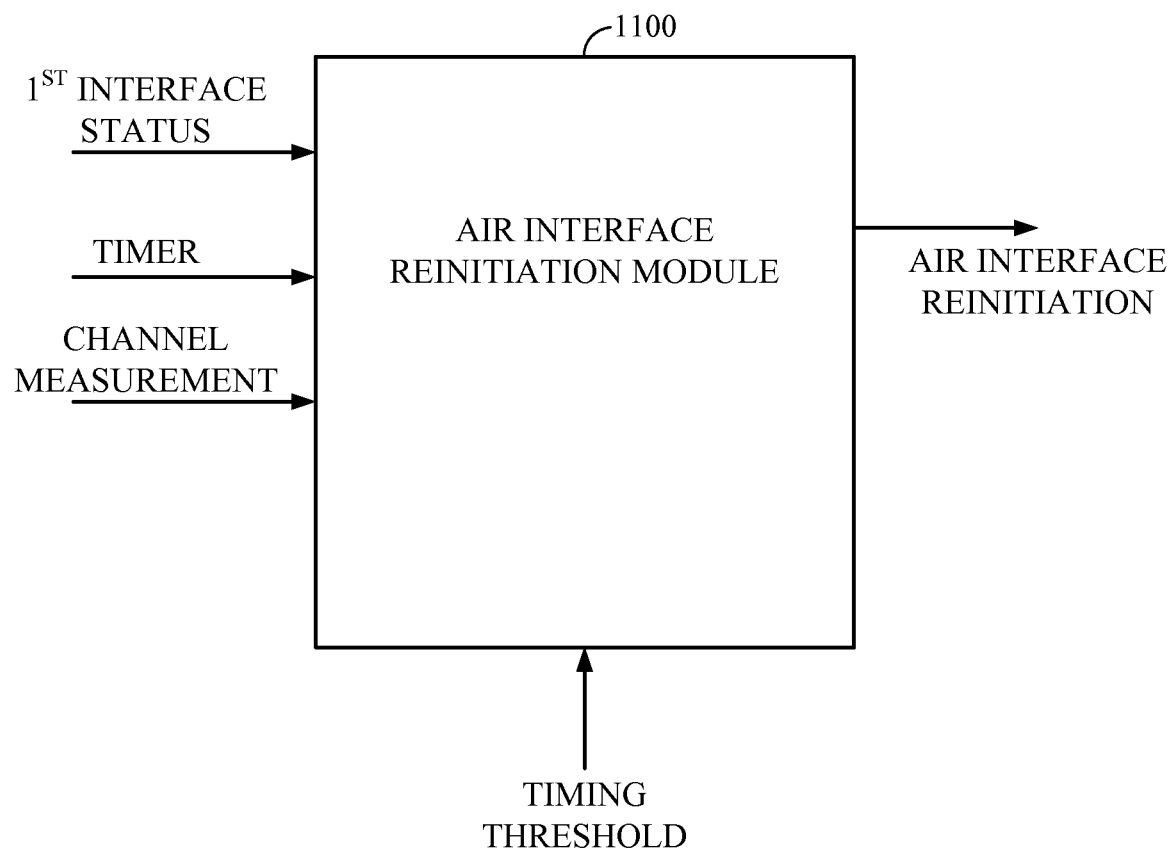
FIG. 11 is functional block diagram of a module for adding an air interface.

FIG. 11 is functional block diagram of a module for adding an air interface. Such a module can be embodied in software, firmware, hardware, or some combination thereof. The module can be configured to perform at least one of the processes 800, 900, 1000 described above with respect to FIGS. 8, 9, and 10, respectively. The module 1100 can receive a first interface status indicating whether or not the first air interface is in a traffic mode, the output from a timer, and/or a channel measurement. The module 1100 can also receive a timing threshold or other thresholds. Output from the module 700 is a decision regarding whether the second air interface could be added. This decision can include instructions to add a second air interface. This decision can also include information that the second air interface should not be added, or simply output nothing in the case that the second air interface should not be added.

While the specification describes particular examples of the present invention, those of ordinary skill can devise variations of the present invention without departing from the inventive concept. Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method of dropping an air interface, the method comprising:
concurrently communicating over a first air interface and a second air interface;
determining whether a violation of a power constraint indicative of a power imbalance has occurred by:
measuring a receive power of the first air interface and a receive power of the second air interface;
determining a difference between the measured receive power of the first air interface and the measured receive power of the second air interface, and
determining whether a value of the determined difference is greater than a predefined threshold, indicating the power imbalance;
determining whether the second air interface is in an idle state if the power constraint is violated; and
dropping the second air interface, if it is determined that the power constraint is violated and the second air interface is in the idle state.

2. The method of claim 1, wherein the first air interface supports voice traffic and the second air interface supports data traffic.

3. The method of claim 1, wherein the first air interface is a 1x interface and the second air interface is a DO interface.

4. The method of claim 1, wherein concurrently communicating over the first air interface and the second air interface comprises communicating over the first air interface at a first frequency and communicating over the second air interface at a second frequency.

5. The method of claim 1, wherein dropping the second air interface comprises switching to a narrowband mode.

6. A device for dropping an air interface, the system comprising:
a transceiver configured to concurrently communicate over a first air interface and a second air interface; and
a processor configured to determine:
whether a violation of a power constraint indicative of a power imbalance has occurred by:
measuring a receive power of the first air interface and a receive power of the second air interface;
determining a difference between the measured receive power of the first air interface and the measured receive power of the second air interface, and
determining whether a value of the determined difference is greater than a predefined threshold, indicating the power imbalance; and
whether the second air interface is in an idle state if the power constraint is violated;
wherein the processor is configured to provide an instruction to the transceiver to drop the second air interface if it is determined that the power constraint is violated and the second air interface is in the idle state.

7. The device of claim 6, wherein the transceiver comprises a first transceiver configured to communicate over the first air interface and a second transceiver configured to communicate over the second air interface.

8. The device of claim 6, wherein the first air interface supports voice traffic and the second air interface supports data traffic.

9. The device of claim 6, wherein the first air interface is a 1x interface and the second air interface is a DO interface.

10. The device of claim 6, wherein the transceiver is configured to communicate over the first air interface at a first frequency and communicate over the second air interface at a second frequency.

11. The device of claim 6, wherein the processor is further configured to switch to a narrowband mode.

12. A device for dropping an air interface, the device comprising:
means for concurrently communicating over a first air interface and a second air interface;
means for determining whether a violation of a power constraint indicative of a power imbalance has occurred by:

measuring a receive power of the first air interface and a receive power of the second air interface;

determining a difference between the two measurements, and determining whether a value of the difference is greater than a predefined threshold, indicating the power imbalance;

means for determining whether the second air interface is in an idle state if the power constraint is violated; and means for dropping the second air interface, if it is determined that the power constraint is violated, and if it is determined that the second air interface is in the idle state.

13. The device of claim 12, wherein the first air interface supports voice traffic and the second air interface supports data traffic.

14. The device of claim 12, wherein the first air interface is a 1x interface and the second air interface is a DO interface.

15. The device of claim 12, wherein the means for concurrently communicating over the first air interface and the second air interface comprise means for communicating over the first air interface at a first frequency and communicating over the second air interface at a second frequency.

16. The device of claim 12, wherein the means for dropping the second air interface comprise means for switching to a narrowband mode.

17. A computer chip encoded with instructions for executing a method of dropping an air interface, the method comprising:

concurrently communicating over a first air interface and a second air interface;

determining whether a violation of a power constraint indicative of a power imbalance has occurred by:

measuring a receive power of the first air interface and a receive power of the second air interface;

determining a difference between the measured receive power of the first air interface and the measured receive power of the second air interface, and determining whether a value of the determined difference is greater than a predefined threshold, indicating the power imbalance;

determining whether the second air interface is in an idle state if the power constraint is violated; and dropping the second air interface, if it is determined that the power constraint is violated and the second air interface is in the idle state.

18. The computer chip of claim 17, wherein the first air interface supports voice traffic and the second air interface supports data traffic.

19. The computer chip of claim 17, wherein the first air interface is a 1x interface and the second air interface is a DO interface.

20. The computer chip of claim 17, wherein concurrently communicating over the first air interface and the second air interface comprises communicating over the first air interface at a first frequency and communicating over the second air interface at a second frequency.

21. The computer chip of claim 17, wherein dropping the second air interface comprises switching to a narrowband mode.

* * * * *